United States Patent
Maggard et al.

[11] Patent Number: 6,021,362
[45] Date of Patent: Feb. 1, 2000

[54] METHOD AND APPARATUS FOR DISPENSING SAMPLES AND PREMIUMS

[76] Inventors: Karl J. Maggard, 4801 Perrregrine Pt Cir, Sarasota, Fla. 34231; George Mercer, 1861 Eau Claire Ct, Oldsmaf, Fla. 34677; Steven B. Gold, 648 Bayview Dr., Longboro Key, Fla. 34228

[21] Appl. No.: 09/024,450

[22] Filed: Feb. 17, 1998

[51] Int. Cl.⁷ ...................................................... G06F 7/00
[52] U.S. Cl. ......................... 700/234; 700/233; 700/240; 235/375; 235/383
[58] Field of Search .................................. 700/234, 232, 700/233, 236, 240; 235/375, 383

[56] References Cited

U.S. PATENT DOCUMENTS

| | | | |
|---|---|---|---|
| 4,124,109 | 11/1978 | Bissell et al. | 194/4 R |
| 4,554,446 | 11/1985 | Murphy et al. | 235/487 |
| 4,723,212 | 2/1988 | Mindrum et al. | 364/401 |
| 4,825,045 | 4/1989 | Humble | 235/383 |
| 4,910,672 | 3/1990 | Off et al. | 364/405 |
| 5,056,019 | 10/1991 | Schultz et al. | 364/405 |
| 5,173,851 | 12/1992 | Off et al. | 364/401 |
| 5,244,116 | 9/1993 | Leo | 221/232 |
| 5,290,033 | 3/1994 | Bittner et al. | 273/138 A |
| 5,368,129 | 11/1994 | Von Kohorn | 186/52 |
| 5,459,306 | 10/1995 | Stein et al. | 235/383 |
| 5,483,049 | 1/1996 | Schulze, Jr. | 235/383 |
| 5,515,270 | 5/1996 | Weinblatt | 364/405 |
| 5,535,921 | 7/1996 | Gelman et al. | 222/78 |
| 5,612,868 | 3/1997 | Off et al. | 364/214 |
| 5,665,953 | 9/1997 | Mazzamuto et al. | 235/383 |
| 5,687,322 | 11/1997 | Deaton et al. | 395/214 |
| 5,717,866 | 2/1998 | Naftzger | 395/214 |

*Primary Examiner*—William E. Terrell
*Assistant Examiner*—Khoi H. Tran
*Attorney, Agent, or Firm*—McDermott, Will & Emery

[57] ABSTRACT

A system for dispensing sample products and premiums which includes at least one data entry terminal operable for identifying particular circumstances including items being purchased by a given consumer and for generating an output signal identifying each of the products or other qualifiers, memory means for storing at least one sample/premium file which identifies each product or qualifier for which a given sample or premium should be dispensed, a data processor coupled to the data entry terminal and the memory and operable for receiving the output signal from the data entry terminal, for comparing the products or other qualifiers identified therein to the sample/premium file and for generating a sample/premium dispense signal if any of the purchased products or other qualifiers are listed in the sample file, and sample/premium dispensing device coupled to the microprocessor and operative for receiving the sample/premium dispense signal and dispensing a sample or premium. A system for the creation and continuous real-time updating of consumer purchase behavior databases through the capture, maintenance, organization and analysis of the purchase activity of consumers which database is generated through the use of the system for the dispensing of sample products and premiums as aforesaid.

31 Claims, 6 Drawing Sheets

METHOD AND APPARATUS FOR DISPENSING SAMPLES AND PREMIUMS

FIELD OF THE INVENTION

The present invention relates to the automated distribution of items, generally in the form of sales premiums, marketing incentives and/or product samples, to individuals determined to be eligible to receive such items, through real-time electronic database creation and analysis; and more specifically to a method and apparatus for (i) the creation, of a continuously updated, real-time database relating to consumer behavior in retail establishments, (ii) the management and analysis of such database for purposes including, but not limited to, the forecasting of consumer demand and the relationship among products purchased by consumers with respect to consumer goods in existence or consumer goods proposed to exist; (iii) the management and analysis of such database for purposes of devising promotions and/or pricing strategies for consumer goods; (iv) the method and apparatus for distribution of certain tangible and/or intangible items of value, in the form of samples and premiums to targeted individuals as determined by such database management and analysis.

BACKGROUND OF THE INVENTION

The use and distribution of product samples and promotional incentives are common tools utilized by manufacturers and retailers in their marketing efforts. Generally, these materials are of two separate and distinct classes:

(i) product samples, in which the manufacturer or retailer desires to obtain consumer "trial" of the product. Such use is commonly referred to as "sampling";

(ii) premiums, marketing incentives and promotional items, used to encourage prospective consumers to purchase a particular product or exhibit some other desired behavior, such as loyalty to a particular brand in order to receive something of value. Such items are referred to herein collectively as "premiums".

Both sampling and premiums are highly effective in accomplishing their respective objectives. Both, however, are burdened with significant costs and inefficiencies having the combined effect of reducing or eliminating their use, as detailed further below. As a result, manufacturers and retailers are denied an otherwise effective means of introducing new products to consumers and/or encouraging consumers to be loyal, frequent buyers.

Manufacturers and retailers have most often attempted to overcome these obstacles through the use of coupons. Consumers are well aware of the use of "cents-off" or discount coupons to encourage the purchase of products they are familiar with. However, while commonly used, coupons are an inefficient method of encouraging consumers to use the manufacturer's products, as the industry standard redemption rate of less than 2% testifies. Further, coupons are an inferior method of obtaining consumer "trial" of a new product. It is widely understood that product samples placed in the hands of consumers who evidence a need or desire for the product is the single most effective method for obtaining new product "trial". See, 1997 *Annual Report of the Promotion Industry, Promo, The Magazine of Promotion Marketing*, July, 1997; *Cox Direct* 19$_{th}$ *Annual Survey of Promotional Practices*, p. 51; *Brand Marketing*, August 1997; *The New York Times*, sec. 3 p.1, Sunday, Aug. 24, 1997.

Manufacturers and retailers spend billions of dollars annually on consumer promotions and advertising. Notwithstanding the amount spent, data is not generally available on a real-time, broad-market basis, to analyze for guidance in structuring those promotional and advertising expenditures. As a result, efficiency in those expenditures suffers with harm to manufacturers, retailers and consumers.

Issues Respecting the Use of Samples and Premiums

The two principal areas of costs for both samples and premiums, aside from the intrinsic cost of the sample or premium itself, are:

(i) inefficiency in limiting delivery of the sample or premium to the target audience. Providing a sample to someone who is not a bona fide prospective purchaser is a wasted expense. Providing a premium to someone who has not done the necessary things to earn the premium is also a waste. The objective is the limitation of distribution of samples and premiums to those who are "qualified" to receive them. Qualification is discussed further below.

(ii) The availability and cost of the means of immediate delivery of the sample or premium to the individual so qualified.

Qualification of Recipient

It is axiomatic that manufacturers and retailers are driven by cost burdens to maximize the effectiveness of the enormous sums spent on marketing and merchandising. Ineffective or inefficient devices are dropped at the point their cost exceeds the marketing benefit generated. While some marketing programs are understood to be highly effective, their costs are so high their use is infrequent or barred to all but the largest companies. Sampling and premiums are principal examples of this circumstance. From a competitive perspective, smaller market entrants are faced with barriers to the use of the most effective marketing devices. Consumers, the primary beneficiaries of vigorous competition, are therefore harmed as a result of the restrictive competitive environment that results.

Qualification of the recipient eliminates the most significant avoidable cost in the use of samples and premiums. The difficulty for manufacturers and retailers is that the vast majority of recipients are not, in fact, prospective purchasers of the item being sampled or accompanying the premium. To the extent samples or premiums are delivered to such recipients, the commercial value of the sample or premium distribution effort is lost.

To overcome this hurdle, the present invention uses real-time analysis of the consumers purchases or other factors determined at check-out to qualify them as an individual the manufacturer or retailer has identified as a desired recipient of the sample or premium. This is accomplished by the capture of information as items are scanned by the retailer's point-of-sale (POS) equipment, and the analysis of that information. "Items scanned", as used herein, includes not only what is purchased but also other sorts of qualifiers, such as loyalty cards, coupons available on site, coupons distributed by other means (on retail packages, separately mailed to consumers, in magazines, etc.)

Availability of Efficient, Immediate Delivery

Delivery of the sample or premium is the second cost which, while not avoidable, is subject to significant reduction over the cost of current means of delivery. The least sophisticated means of distribution—the in-store giveaway—is also the least efficient. In addition to the cost of the dedicated personnel required, the number of samples delivered is low. Because everyone is given a sample on request, there is no discrimination between prospective purchasers and the simply curious or opportunistic. Other means of delivery, such as direct mail to mailing list members, zip code mailing, accompanying newspapers, are all efforts to improve the ratio of wasted samples to intended recipients. These do not adequately correct the inefficiency that currently exists.

Further, none of these means offers the manufacturer or retailer the opportunity to directly link the receipt of the sample or premium with the purchase of the qualifying product or the use of another qualifier, such as the use of a loyalty card. This is of particular importance to the use of premiums, where the objective is to provide the incentive contemporaneously with the purchase of the product associated with the premium. In the case of both samples and premiums, the motivation of the consumer to exhibit the behavior desired by the retailer or manufacturer—i.e. the obtaining of the sample to "give it a try" or the purchase of the item in order to obtain the premium—is dramatically reduced by the time interval between the behavior and the receipt of the sample or premium. Nevertheless, the method of accomplishing immediate delivery cannot be so costly as to preclude its use.

Issues Relating to Sampling

"Sampling", broadly defined, is the delivery of an example of a particular item into the hands of a consumer without charge, for the purpose of permitting the consumer to use and determine the desirability of the item, with the intention that the consumer will subsequently purchase that product. Samples are virtually always smaller sizes of products available for purchase in the retail establishment.

The use of "sampling" as a marketing tool is significantly restricted due to its high cost and low efficiency. The costs are a function of the methods used for distribution of products, such as in-store give-aways, direct mail, accompanying newspaper delivery, attached to magazines, etc. Each of these entails significant per-unit costs for handling, postage, packaging, etc. Further compounding the cost to the manufacturer is the fact that samples are delivered in an unsophisticated "shotgun" manner in which the vast majority of recipients are not interested in and do not want the sample, or are happy to receive a free sample, but are not, in fact, potential purchasers of the product. The compound effect of inefficiency in the selection of sample recipients renders sampling out of the reach of the great majority of manufacturers notwithstanding the effectiveness of placing the samples into the hands of prospective purchasers.

Efforts have been made in the past to improve the efficiency of sampling. These have been based upon the use of mailing lists, zip code delivery, etc. of samples. In each case, the intention is to narrow the broad approach of sampling more to consumers who, it is hoped, are better prospects as future purchasers. While mailing lists, zip code delivery and the like are superior to a simple broadcast of samples to all comers (such as in store sampling typifies), such devices do not accurately or consistently identify potential purchasers. These approaches strive for improvement in the cost-benefit equation, but do not succeed.

Accordingly, there exists a need for a method and system which enables the consistent "targeting" of potential purchasers and the efficient delivery of the sample to such individuals. In other words, a "targeted sampling" system in which samples are distributed only to consumers that are predetermined to be, in fact, potential purchasers of the product. These objectives are accomplished through the acquisition of real-time consumer purchase decision information, the real-time analysis of that information and historical data to identify whether the consumer is a potential purchaser of the products available for sampling, and the delivery of the sample to the consumer contemporaneously with the conclusion of the visit to the retail establishment.

The real time information is collected as a consumer's products are scanned by the retailer's point-of-sale (POS) equipment. Such information is commonly collected and used for a number of purposes, including inventory control, consumer demand analysis, trend interpretation, etc. In U.S. Pat. No. 5,612,868, this information is also used to generate coupons printed and delivered to the consumer at check-out. Thus, while the collection of real-time purchase information is and has been used for a wide variety of purposes since the implementation of grocery retailer bar-code scanners in the early 1970's (commonly referred to as universal product code (UPC) scanners), the methods and systems have not been developed to identify potential purchasers of products available for sampling in conjunction with a method and system for dispensing of those samples at the time of check-out. An object of the present invention is to satisfy the foregoing needs.

Issues Relating to Premiums

Under the term "premiums" are included all incentives offered to consumers to purchase an item, or to be a loyal, repeat purchaser of an item, to be a loyal, repeat patron of a particular retailer, or any other desired consumer behavior. Premiums are, simply, rewards offered to consumers, created to be of sufficient value to the consumer to elicit the behavior desired. "Premiums" are therefore distinguished from "samples" in that the former are not offered for the purpose of demonstrating the desirability of such item in the hope the consumer will purchase that item in the future. "Premiums" are not items generally available for sale in the retail establishment offering the premium.

Experience, common sense and learned treatises support the powerful effect such rewards can have:

Loyalty
    The ability to benefit "best" customers and create incentives for others to become "best" customers.
    The recognition of the value to consumers of their receiving a reward for loyalty.

Promotion
    The ability to benefit heavy users of a product in terms of dollars spent or units purchased.
    The ability to benefit frequent visitors to the retailer.

Competition
    The means for manufacturers and retailers to compete on bases other than, and in addition to, price discounts.
    The ability to tailor incentives to the needs and desires of particular customers.

An effective premium marketing program must embody the following elements:

Accurate determination of eligibility of individual consumers to receive the premium, on the spot.

Delivery of the premium at the same time the purchase occurs.

Flexibility to deliver a premium that is not an on-the-shelf item of the establishment. (Note that, premiums are not items otherwise available for purchase in the retailer's establishment. Such items would properly be considered "samples", not "premiums").

The creation of no incremental burden to the retailer.

Must be cost effective.

Attempts to date to solve these issues have been unsuccessful:

Attempted solution: place premium inside the package.
  Problems created: Limitations on size of premium; manufacturing cost and/or feasibility issues; contamination issues; value limited; inability to increase premium for best customers.

Attempted solution: Mail in coupons, proofs of purchase.
  Problem created: delayed reward; separation of direct contact with retailer.

Attempted solution: Bundling the premium with the items to be purchased.
  Problems created: Manufacturer/retailer coordination issues; distribution and stock keeping issues for retailer and manufacturer; manufacturing cost and/or feasibility issues.

Significantly, the most important requirement—the accurate determination of eligibility of the individual consumer to receive the premium on bases beyond simply the purchases made at any one time—has no previous known attempted solution.

The present invention responds to each of these needs.

Issues Relating to Database Creation

The need for accurate consumer behavior is demonstrated by the sums and effort spent by manufacturers and retailers to develop such information. Retailers representing in excess of $80 billion in retail sales are attempting to develop such databases relating solely to their own operations. The total of advertising and marketing expenditures on consumer retail grocery products exceeds $70 billion per year. The potential savings for even small improvements in efficiency are therefore substantial. Efficient collection of such data has heretofore been difficult because the means of collection of that data is inadequate.

Currently, consumer purchase behavior is predicted by market research limited to "focus groups" (i.e., asking small groups of consumers their opinions), demographic analysis and to the statistical analysis of historical data These devices are expensive and uncertain in effect. While the analysis of a broad database of real-time consumer purchase behavior would provide a critical element in improving the efficiency of determining consumer purchase behavior, such database has not been readily available. Three reasons exist for this lack: the means for collecting the data is inadequate; retailers have insufficient incentive to permit the collection of such information; consumers also have insufficient incentive to permit the collection of such information.

While computers have been available to serve this need, the issue has been how to collect the information. Scanner data, i.e., the record of purchases collected by the retailer, is currently available on a historical basis from several market research firms, such as IRI, Neilsen and others. The data provided by them is historical and not current, real-time data, and it typically includes only total purchases of identified products and prices. Information identifying particular consumers' purchases, enabling the statistical correlation between the purchase of one item by a consumer, for example, lipstick, at the same time another item is purchased, for example, nail polish is virtually unavailable. It is the determination of these correlations that will enable manufacturers and retailers to better understand their consumers and to offer promotional and marketing opportunities of greater value to consumers.

The difficulty of creating the database arises in part from the lack of a sufficient incentive for retailers to cooperate in the installation of the data processing equipment to obtain retail transaction data. Similarly, consumers have no sufficient incentive to consider permitting their identity to be recorded along with their purchases, or to patronize a retailer who collects transaction data irrespective of the consumer being identified. The present invention responds to these issues. Through the use of an interface with the retailer's POS equipment, the transaction data and the identity of the consumer, if available, is recorded without interfering with the retailer's POS equipment. The facility by which samples are dispensed on the basis of transaction data generated in real-time (i.e., the presence of a qualifying purchase of event determined at check-out, and the immediate dispensing of a premium or sample) provide the incentive for the consumer to patronize the retailer having such a facility, and thus, the incentive for the retailer to have it.

SUMMARY OF THE INVENTION

The present invention relates to a method and apparatus for distributing samples or premiums which accurately identifies consumers qualified to receive the sample or premium, minimizes the cost associated with the distribution, and which simultaneously results in the efficient distribution of the samples or premiums, generating at the same time, a record of each transaction at that retailer so as to solve the aforementioned problems. As such, the present invention provides a system for automatically dispensing a sample or premium at the point of sale in response to purchases by "qualified" consumers; such qualification occurring through the real-time recognition by the retailer's point-of-sale equipment of pre-established criteria ("qualifiers") as determined by the retailer or manufacturer, including, but not limited, to the identification of the purchaser of particular brands of products; the identification of the purchase of particular types of products; the identification of the purchase of certain quantities of particular products; total purchase size; the identification of the use of "loyalty cards"; the identification of the use of a credit card; the identification of a coupon distributed in-store or previously received by the consumer, the identification of the individual as a member of the group of qualified individuals, etc., and the recording of such information for real-time analysis.

More specifically, the present invention relates to a system for dispensing sample products and premiums which comprises at least one data entry terminal operable for identifying a predetermined qualifier (or lack or qualifier) for that consumer in real time and for generating an output signal identifying each of the qualifiers, memory means for storing at least one sample/premium file which identifies each qualifier for which a given sample or premium should be dispensed, a data processor coupled to the data entry terminal and the memory means and operable for receiving the output signal from the data entry terminal, for comparing the qualifiers identified therein to each sample/premium file and for generating a sample/premium dispense signal if any of the qualifiers are listed in the sample/premium file, and sample or premium dispensing means coupled to the microprocessor and operative for receiving the sample/premium dispense signal, dispensing a sample or premium, and recording all information regarding each consumer's transaction.

The present invention also relates to a method for dispensing samples and premiums. The method includes the steps of qualifying the consumer through identifying each item being purchased by a given consumer and/or other predetermined qualifiers of that consumer and generating an output signal identifying each of the qualifiers, storing at least one sample/premium file, the sample/premium file identifying each qualifier for which a given sample or premium should be dispensed, comparing the qualifiers identified in the output signal to the sample/premium file, and generating a sample/premium dispense signal if any of the qualifiers are listed in the sample/premium file, and transmitting the sample/premium dispense signal to a sample/premium dispenser, dispensing the corresponding sample or premium and recording all information regarding each consumer's transaction.

As described in detail below, the method and apparatus of the present invention provides important advantages over the prior art. Most importantly, the present invention provides an economical method and system for distributing product samples and premiums to consumers, limited to those that qualify by purchase of particular products, or possess such other qualifiers, as predetermined by the manufacturer and/or retailer to be useful in their respective marketing efforts.

Another advantage is that the present invention eliminates the economic waste associated with the mass distribution of product samples.

Yet another advantage of the present invention is that it limits the number of samples or premiums distributed to a given consumer to the desired amount.

Another advantage is the prevention of the distribution of samples or premiums to unqualified consumers.

Another advantage is the creation of a database permitting real-time analysis of the purchase behavior of consumers.

Additional advantages of the present invention will become apparent to those skilled in the art from the following detailed description of exemplary embodiments, which exemplify the best mode of carrying out the invention.

The invention itself, together with further objects and advantages, can be better understood by reference to the following detailed description and the accompanying drawings.

BRIEF DESCRIPTION OF THE DRAWINGS

FIG. 1b illustrates one possible modification of the embodiment of the sample/premium distribution system illustrated in FIG. 1a.

DETAILED DESCRIPTION

A sample and premium distribution system and real-time consumer purchase behavior database creation, in accordance with the present invention is described below. In the following description, numerous specific details are set forth, such as exemplary scanning means, product identification means, and consumer qualification requirements etc., in order to provide a thorough understanding of the present invention. These specific details need not be employed exactly as set forth herein to practice the present invention. In other instances, well known system components have not been described in detail in order to avoid unnecessarily obscuring the present invention.

Figure 1A:
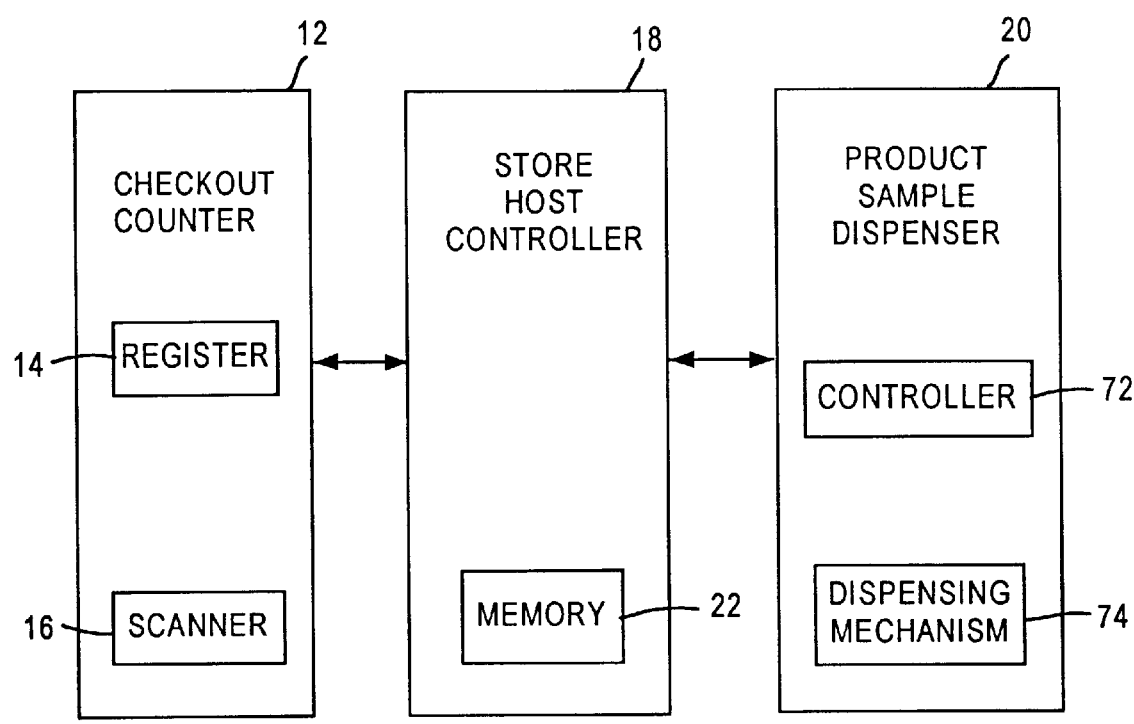
FIG. 1a illustrates a first exemplary embodiment of the block diagram of the sample/premium distribution system of the present invention.

FIG. 1a illustrates a block diagram of a first exemplary embodiment of the sample/premium distribution system 10 of the present invention. The system 10 comprises a check-out counter 12 which includes the customary universal product code ("UPC") scanner 16, a point-of-sale unit 14 (also known as a register), and a display unit (not shown). In the current embodiment, register 16 also includes a printer (not shown) which can be utilized to print receipts and unique VendCodes as described below.

The system 10 further comprises a host computer 18 and a product sample/premium dispenser 20. As shown, the host computer 18 is coupled to both the check-out counter 12 and the product sample/premium dispenser 20. The host computer 18 can comprise a standard personal computer ("PC") possessing sufficient processing power and memory 22.

The product sample/premium dispenser 20 is similar to a standard vending machine, in that it is capable of housing and distributing items on demand such as Crane National Vendors Refreshment Center 2. In accordance with the present invention, however, the dispenser 20 further comprises a controller 72 or microprocessor and a data port for communicating with the host computer 18. The communications between the dispenser 20 and the host computer 18 can utilize any known communication technique, such as RS-232 serial communications. Alternatively, communications between the devices can be by standard parallel and/or wireless techniques. The sample/premium dispenser 20 receives a sample/premium dispense signal from the host computer 18 which identifies the sample or premium to be distributed. Communications between the host computer 18 and the check-out counter 12 can also be accomplished by any known techniques, including serial, parallel and wireless transmission.

The controller 72 of the sample dispenser 20 functions to control the operation of a dispenser mechanism 74 forming part of the dispenser 20. The dispenser 20 is programmed such that each sample/premium that can be dispensed is assigned an identifying code. Identical identifying codes are stored in the memory 22 of the host computer 18 in sample/premium files, as described below. Upon occurrence of a triggering event, the host computer 18 retrieves the identifying code from the appropriate sample/premium file, generates a sample/premium dispense signal containing the identifying code of the product to be dispensed, and forwards the sample/premium dispense signal to the dispenser 20.

Upon receipt of the sample/premium dispense signal, the controller 72 decodes the signal and activates the appropriate dispensing mechanism within the dispenser 20 so that the desired sample or premium is dispensed. Any one of numerous coding techniques can be utilized. The bit size of the sample/premium dispense signal will vary in accordance with the number of possible samples and premiums that can be dispensed and the controllers being utilized. For example, if only two samples were available for distribution, then only a single bit would be required to identify which of the samples to dispense. Of course, additional bits will be necessary in accordance with the data transmission protocols of the microprocessors/controllers utilized in the host computer 18 and the dispenser 20.

In accordance with the first embodiment of the present invention, the dispenser 20 is physically designed so as to fit within the space available at standard check-out counters such that the sample product or premium can be readily obtained by the qualified recipient.

Figure 5:
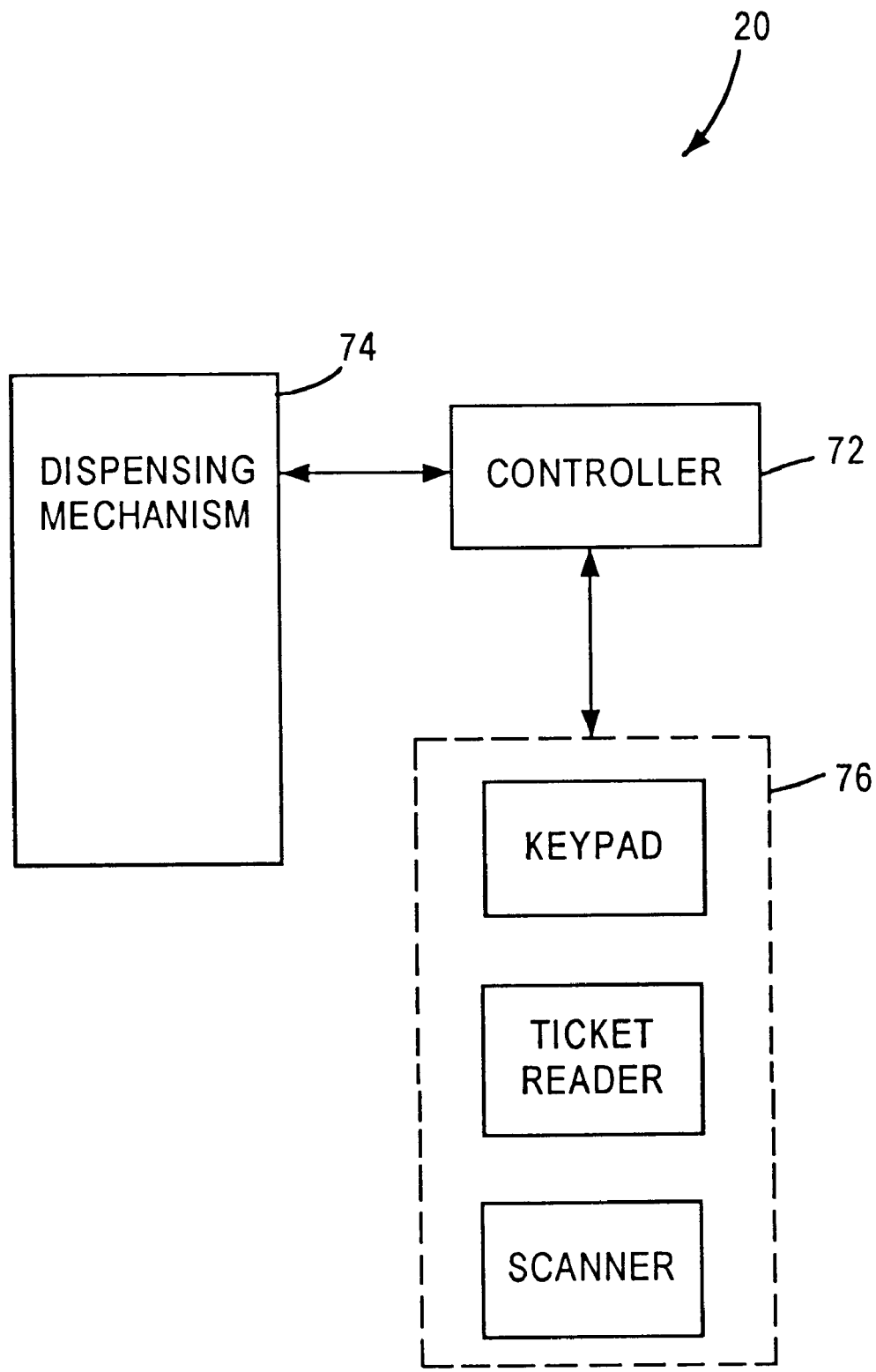
FIG. 5 is a block diagram of the sample/premium dispenser in accordance with the second embodiment.

Referring to FIG. 5, in a second embodiment of the present invention, in addition to the controller 72 and the dispensing mechanism 74, the dispenser 20 also comprises an input device 76 such as a keypad, ticket reader and/or a scanner for allowing a consumer to enter a VendCode (described below). The input device 76 is also coupled to the controller 72 so as to allow the controller to act on any signals received therefrom. Communications between the input device 76 and the controller 72 can be by any known technique. In accordance with the second embodiment, the dispenser 20 can be located at a single location within the retail store.

Figure 1B:
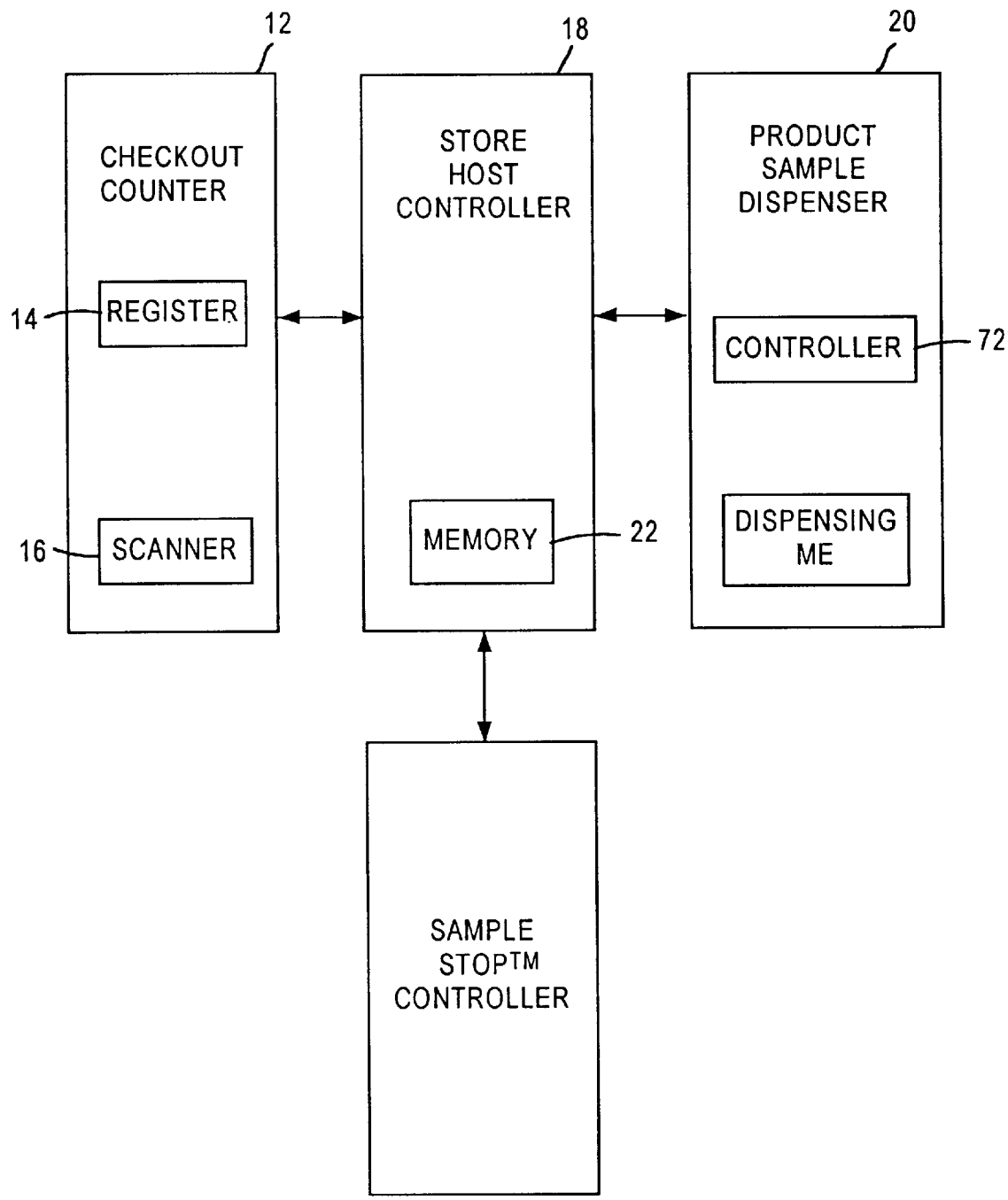

As shown in FIG. 1b, the present invention can also be implemented by providing a "Sample Stop" computer 21 which interfaces with the host computer 18 and the sample/premium dispenser 20, and performs all of the functions of the present invention, which are described herein as being performed by the host computer 18. The "Sample Stop" computer 21 is indicated by dashed lines in FIG. 1 and can communicate with the host computer 18 and the sample/premium dispenser 20 by any known techniques, including serial, parallel and wireless transmission. Similar to the host computer 18, the "Sample Stop" computer 21 can be a standard personal computer having the necessary processing power and I/O ports. All data received by the host computer 18 from the check-out counter 12 is directly passed on to the "Sample Stop" computer 21 for processing. In addition, when the "Sample Stop" computer 21 is utilized, the sample/premium files can be stored in the associated memory.

Memory 22 of the host computer 18 comprises a plurality of sample/premium files, each of which identifies the qualifier(s) or events for which a particular sample or premium should be dispensed. For example, if a product qualifier is identified in a sample file, upon purchase of the product, a sample will be dispensed. Typically, each sample/premium to be dispensed has a corresponding sample/premium file, which can identify one or more "triggering" qualifiers (i.e., events or criteria that upon completion thereof the sample or premium is dispensed). As stated above, in the present embodiment each sample/premium file also contains the identifying code corresponding to the sample or premium associated with the given file. Upon completion of a triggering event, the host computer 18 utilizes the identifying code contained in the sample/premium file corresponding to the completed event to generate the sample/premium dispense signal. The sample/premium files are updated and stored in memory 22 as required.

The host computer 18 records the details of each transaction and stores the results in memory 22.

Figure 2:
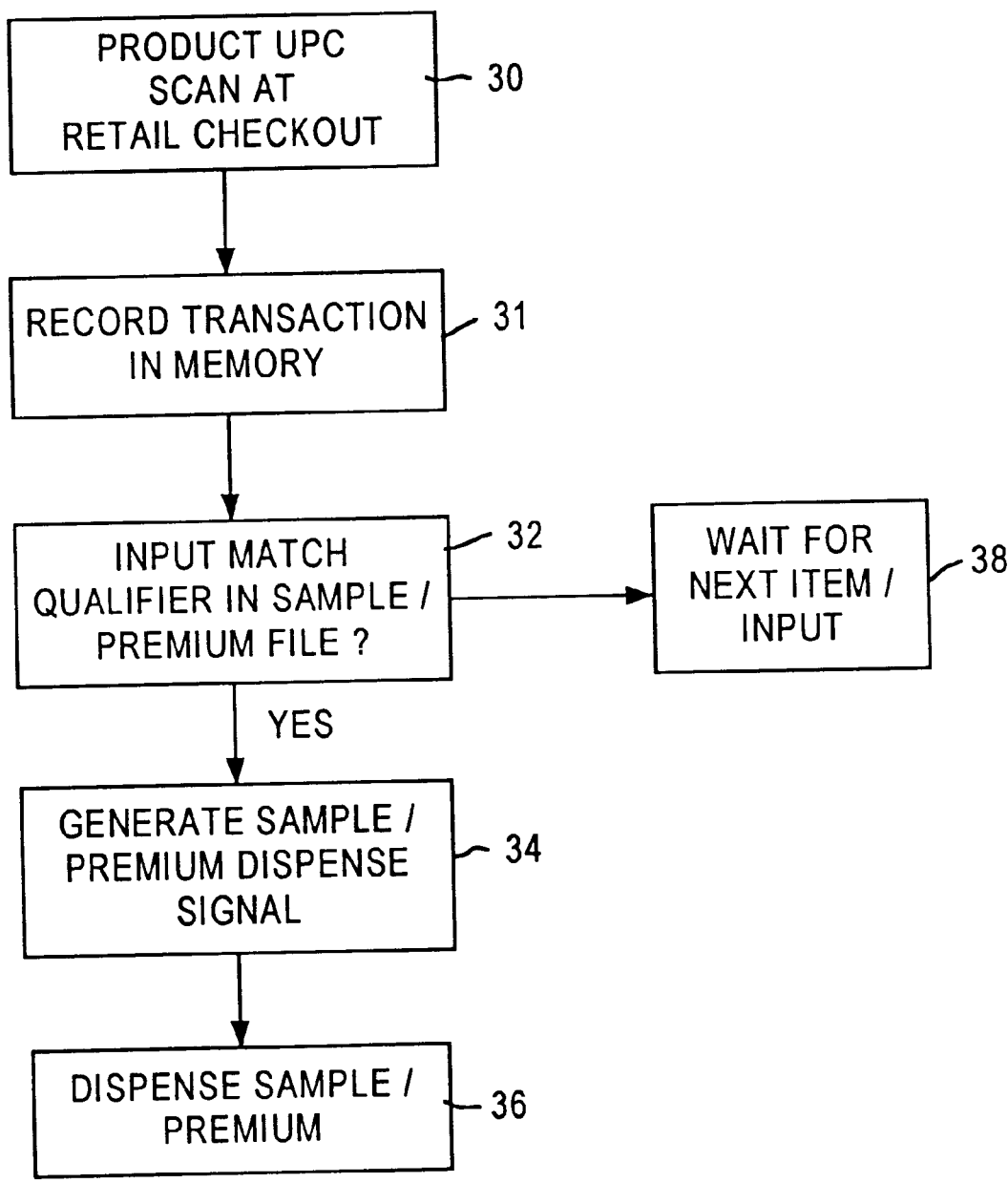
FIG. 2 is a flowchart illustrating the operation of the first exemplary embodiment of the present invention.

The flow chart of FIG. 2 describes the general operation of the system of the present invention in accordance with the first embodiment. As shown, during the check-out process at the retail store (e.g., supermarket), the UPC code of each product is read (Step 30) by the scanner 16 and transmitted to the host computer 18. In addition, any other data necessary for identifying a qualifier, such as the use of a loyalty card or order size (e.g., total number of items, total cost, etc.), is transmitted from the scanner 16 or the point-of-sale unit 16 to the host computer 18. For example, if the total purchase price is being utilized as a qualifying event (i.e., a qualifier), then the total cost of the order is forwarded or read by the host computer 18 upon completion of the check-out process. Alternatively, if coupons or loyalty cards are programmed as qualifiers, then similar products, bar codes or magnetic strips disposed on the coupons or loyalty cards can be utilized to identify the use of these items. Of course, any other suitable identification means can be utilized.

The host computer 18 then compares each UPC code or other qualifier received from the check-out counter 12 to the UPC product codes and qualifiers contained in each sample/premium file stored in memory 22 (Step 32). If there is a match (i.e., a predetermined product has been purchased or other qualifier detected/satisfied), the host computer 18 generates a sample/premium dispense signal (Step 34) which identifies the sample or premium to be dispensed. As stated, the sample/premium dispense signal contains the identifying code preprogrammed into both the host computer 18 and the dispenser 20. The sample/premium dispense signal is then transmitted to the sample/premium dispenser 20 (Step 36).

Upon receipt of the sample/premium dispense signal, the controller 72 resident in the sample/premium dispenser 20 decodes the sample/premium dispense signal so as to ascertain the sample/premium to be dispensed and then dispenses the appropriate sample or premium, which can be immediately gathered and placed with the consumer's other purchased items. The sample/premium dispense signal can be transmitted one time at the end of the purchasing session and identify each sample or premium to be distributed. Alternatively, a sample/premium dispense signal can be generated and transmitted to the dispenser 20 each time a purchased product or other qualifier matches a product or other qualifier contained in a sample/premium file.

Depending on the preselected "qualifiers," it may be necessary for the host computer to process the data received from the checkout counter 12 (e.g., has the consumer purchased over $30 dollars worth of products from a given manufacturer). When utilizing such qualifiers, the host computer must be programmed to determine the result (i.e., the occurrence or non-occurrence) of the predetermined "qualifying" event upon receipt of the relevant input data from the check-out counter 12. As a result, acceptable "qualifiers" or "qualifying events" include essentially any event for which the host computer can be programmed to determine whether or not the event occurred.

As stated above, the codes generated by the host computer 18 and contained in the sample/premium dispense signal are preprogrammed into the dispenser 20 (and the host computer 18) such that upon decoding and/or reading the received sample/premium dispense signal, the dispenser selects and dispenses the appropriate sample and/or premium. The details of each transaction as described above, is stored by the host computer 18 in memory 22 for retrieval by any of a number of means such as by modem connection to another computer. Moreover, the transactional information can be transmitted to computers at various and numerous locations. Such distribution of the transactional data can be effected utilizing any suitable transmission medium/distribution network, for example, the internet.

Turning now to the second embodiment of the present invention, which as stated above is directed to the environment where not every check-out counter comprises a dispenser 20, upon satisfaction of a predetermined qualifier, such as the purchase of a specified product, the host computer 18 generates a unique code, hereinafter referred to as a VendCode. The VendCode is communicated to the check-out counter 12 and printed on the consumer's receipt by the cash register printer or a separate piece of paper by a printer which may currently exist or which may be installed as part of this invention. As explained in more detail below, the VendCode identifies the product sample(s) and/or premium(s) to be dispensed, and provides a safeguard against the improper distribution of the same. After completing the check-out process, the consumer enters the VendCode into the dispenser 20, which is typically resident on the store premises, via the dispenser input device 76 and the appropriate sample(s) or premium(s) is dispensed. In one embodiment, the VendCode generated by the host computer 18 is a six digit number that can be readily entered by the consumer into the dispenser 20. Of course, any other type of suitable code can be utilized.

Figure 3:
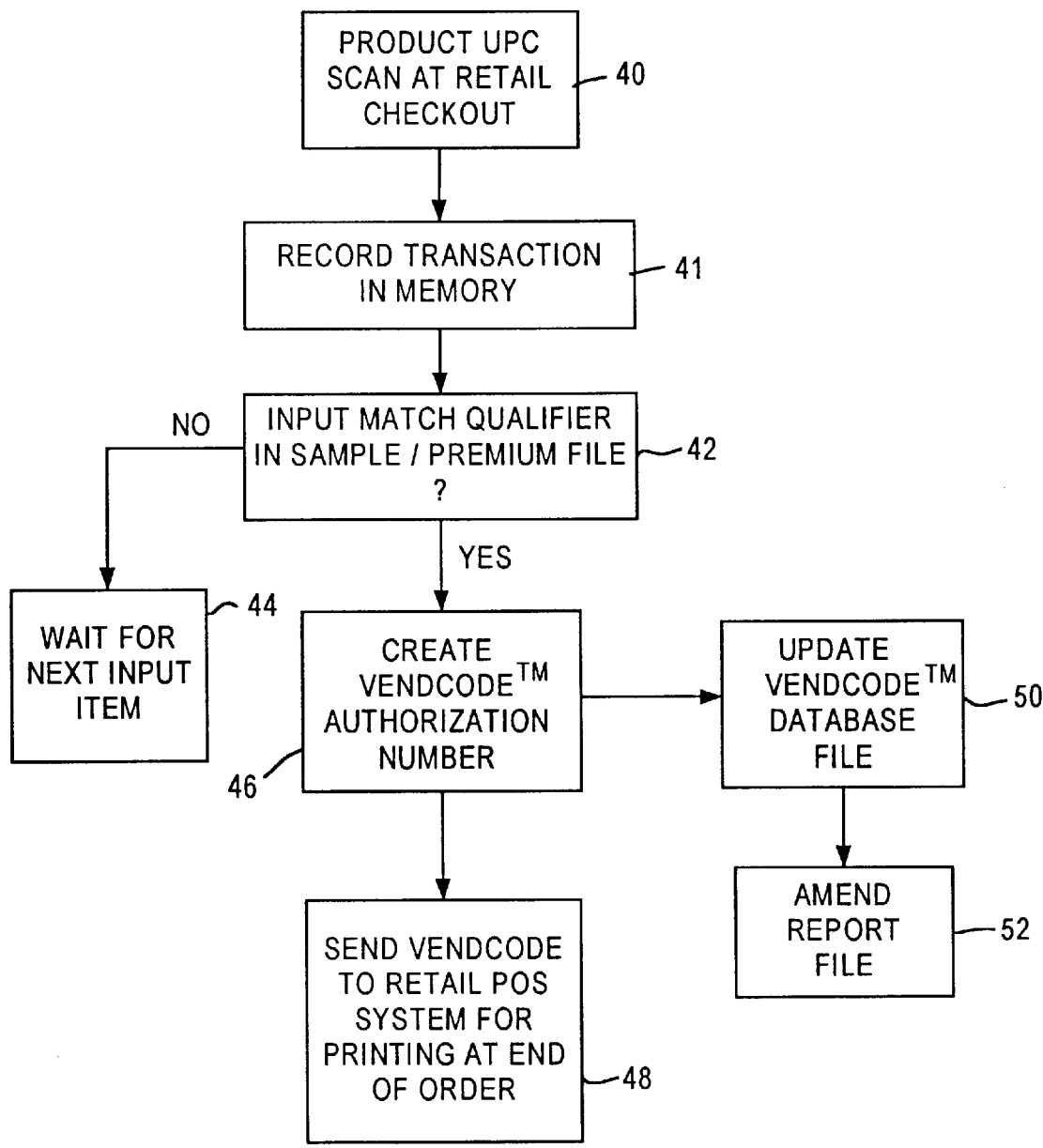
FIGS. 3 and 4 are flowcharts illustrating the operation of a second exemplary embodiment of the present invention.
Figure 4:
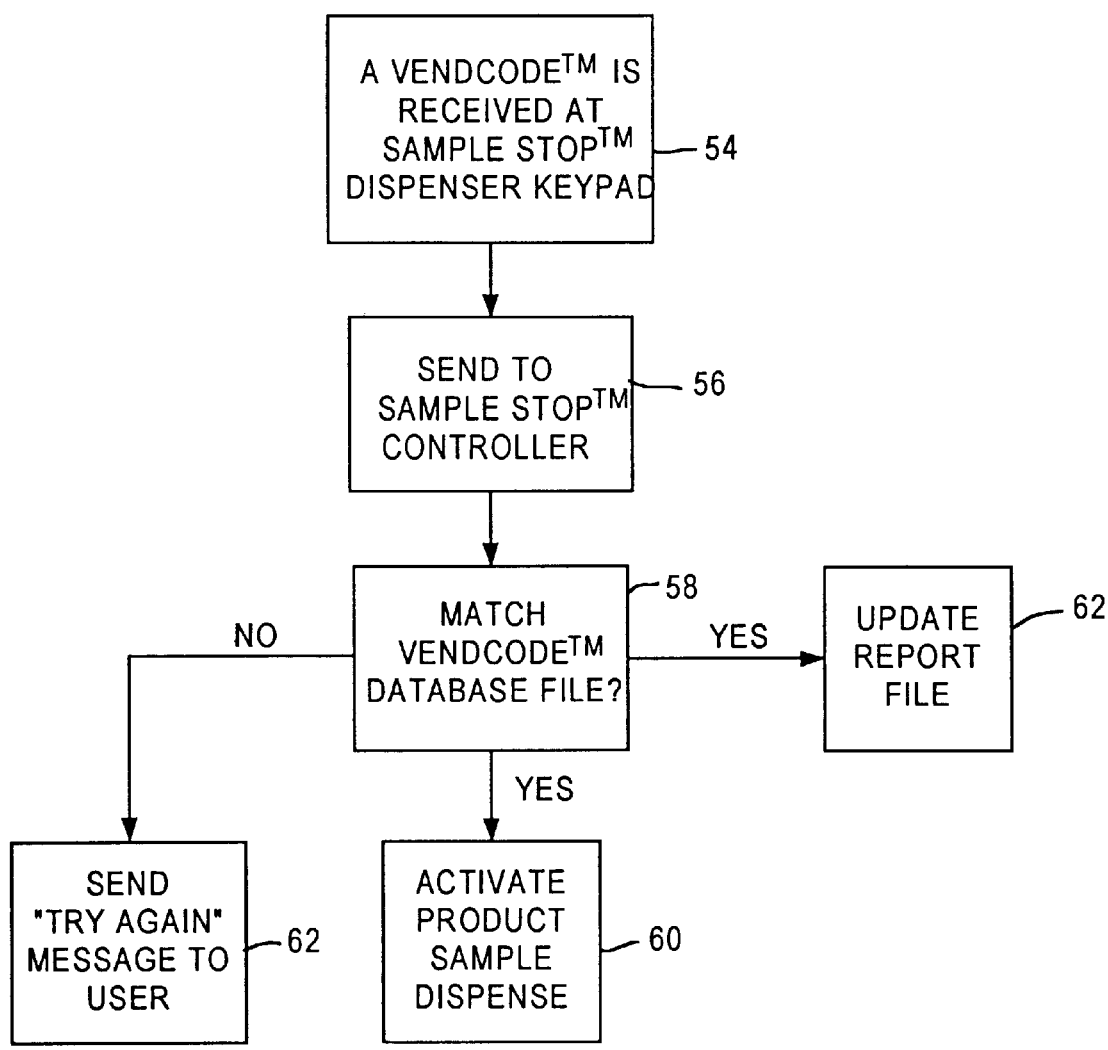

FIGS. 3 and 4 are flowcharts illustrating the operation of the second embodiment of the present invention. In the first step, as with the first embodiment, the qualifier, such as the UPC code of each product is read (Step 40) by the scanner 16 and transmitted to the host computer 18. The host computer 18 then compares each UPC code or other qualifier received from the checkout counter 12 to the list of qualifiers, including the UPC product codes, contained in each sample/premium file stored in memory 22 (Step 42). If there is not a match, the host computer simply waits for the next product to be scanned (Step 44) or other qualifier to be input. If there is a match (i.e., as in the first embodiment a match occurs when the product(s) being purchased match a product(s) and/or satisfy a predetermined qualifier(s) identified in the sample/premium files), the host computer 18 generates a unique VendCode (Step 46) which identifies the sample or premium to be dispensed. The host computer 18 then transmits the VendCode to the check-out counter 12 and commands the printer resident in the check-out counter 12 to print the VendCode at the completion of the order process (Step 48). In one embodiment, each VendCode is generated by a random number generator upon occurrence of a triggering event.

Upon generation of the VendCode, the host computer 18 also stores the VendCode in memory 22 in a VendCode database. Each file in the VendCode database identifies a single VendCode and the corresponding sample and/or premium to be dispensed. The sample/premium to be dispensed can be identified utilizing the preprogrammed codes utilized to identify each sample/premium available to be dispensed. The VendCode database further identifies "active" Vend-Codes (i.e., VendCodes which have been issued, but for which the sample or premium has not been dispensed). It is noted that in the present embodiment, each VendCode corresponds to a single sample or premium to be dispensed, and each VendCode is unique. Of course, it is also possible for a single VendCode to identify every sample and/or premium to be dispensed to a given consumer resulting from a given check-out process. Furthermore, the host computer 18 can be programmed such that unused VendCodes expire after a predetermined period of time (e.g., 1 day, 30 days), such that entry of an expired VendCode would not result in the dispensing of a sample or premium.

In order to obtain the sample or premium, the consumer enters the VendCode into the dispenser 20 (Step 54). The VendCode is entered via the input device 76 (e.g. a keypad) provided on the dispenser 20. Prior to dispensing the sample or premium, the dispenser 20 then transmits the VendCode to the host computer 18 for authentication (Step 56). The host computer 18 authenticates the VendCode by comparing the received code to the "active" VendCodes stored in the VendCode database in memory 22 (Step 58). If the Vend-Code received from the dispenser 20 is identified as being active in the VendCode database, the host computer 18 generates a sample/premium dispense signal (as described above) which is transmitted to the dispenser 20, and the appropriate sample or premium is dispensed (Step 60). If the VendCode received from the dispenser 20 is not identified as being active in the VendCode database, the host computer 18 commands the dispenser 20 to display an appropriate message to the consumer. As such, the improper or unauthorized dispensing of samples or premiums can be prevented.

Once a VendCode has been transmitted to the host computer 18 from the dispenser 20 and has been authenticated, and the corresponding sample/premium dispense signal has been generated by the host computer 18, the VendCode is removed from the "active" VendCode database 62. As such, any consumer re-entering such a VendCode will be informed that the VendCode is no longer valid. The VendCode database archives the samples and premiums distributed and the attendant qualifiers. The VendCode database is updated as necessary. In either of the embodiments described above, the details of each transaction as also described above, is stored in memory 22 by host computer 18 for retrieval by any of a number of methods, such as by modem connection to another computer.

Variations of the foregoing are also possible. For example, while the foregoing embodiment describes the VendCode being entered via a keypad by the consumer, it is also possible to embed the VendCode on a ticket via a magnetic strip or a bar code. The consumer would then insert the ticket into the dispenser (e.g. via a card reader or scanner), whereby the VendCode is read by the dispenser. The sample/premium would then be dispensed as set forth above.

The foregoing embodiments of the present invention provide significant advantages over known sample dispensing systems and provides a premium dispensing system and real-time consumer purchase behavior database where none now exist. Most importantly, the present invention provides an economical method and system for distributing product samples and premiums to consumers most likely to be interested in purchasing the sampled product and premiums to consumers who manufacturers and retailers desire to reward, and a database available for analysis to better serve the needs of manufacturers, retailers and consumers.

Another advantage is that the present invention eliminates the economic waste associated with the mass distribution of product samples.

Yet another advantage of the present invention is that it limits the number of samples distributed to a given consumer to the desired amount.

Another advantage is the prevention of the distribution of samples to unqualified consumers.

Similarly, the foregoing embodiments provide the means for a premium distribution system. Because of the efficiencies inherent in the present invention, arising from the targeting of consumers to receive the premiums, the consequent elimination of waste, the efficiency of the distribution system, the invention will permit the significantly expanded use of such premium programs creating enhanced competition and consequent consumer benefit.

Finally, the foregoing embodiments provide the means for collection of real-time consumer purchase behavior information.

Although the present invention has been described in conjunction with the foregoing exemplary embodiments, it is appreciated that the invention may be implemented in a variety of other ways. Consequently, it is to be understood that the particular embodiments shown and described by way of illustration are in no way intended to be considered limiting. Reference to the details of these embodiments is not intended to limit the scope of the claims which themselves recite only those features regarded as essential to the invention.

We claim:

1. A system for dispensing sample products and premiums, said system comprising:
   at least one data entry terminal operable for identifying items being purchased by a given consumer and predetermined qualifiers, said data entry terminal generating an output signal identifying each of said products or qualifiers,
   memory means for storing at least one sample/premium file, said sample/premium file identifying each product and qualifier for which a given sample or premium should be dispensed,
   a data processor coupled to said data entry terminal and said memory means, said data processor operable for receiving said output signal from said data entry terminal and for comparing said products and qualifiers identified therein to said sample/premium file, said data processor generating a dispense signal if any of said purchased products or qualifiers are listed in said sample/premium file, and
   dispensing means coupled to said microprocessor and operative for receiving said dispense signal and dispensing a sample or premium.

2. A system for dispensing sample products or premiums according to claim 1, wherein said data entry terminal comprises a scanner capable of reading UPC codes.

3. A system for dispensing sample products and premiums according to claim 1, further comprising a plurality of sample/premium files, each of which is associated with a specific sample or premium to be dispensed.

4. A system for dispensing sample products or premiums according to claim 1, wherein said output signal generated by said data entry terminal comprises a UPC code for identifying said purchased products.

5. A system for dispensing sample products or premiums according to claim 1, wherein said output signal generated by said data entry terminal comprises data identifying a predetermined qualifier.

6. A system for dispensing sample products or premiums according to claim 1, wherein said data processor comprises a microprocessor.

7. A system for dispensing sample products or premiums according to claim 1, wherein said dispense signal contains a data field identifying said sample or premium to be dispensed, said dispensing means operative for decoding said dispense signal and dispensing the identified sample or premium.

8. A system for dispensing sample products or premiums according to claim 1, wherein said dispensing means comprises a microprocessor coupled to a data port, said data port being coupled to said data processor.

9. A system for dispensing sample products and premiums, said system comprising:
   at least one data entry terminal operable for identifying items being purchased by a given consumer and predetermined qualifiers, said data entry terminal generating an output signal identifying each of said products or qualifiers,
   memory means for storing at least one sample/premium file, said sample/premium file identifying each product and qualifier for which a given sample or premium should be dispensed,
   a data processor coupled to said data entry terminal and said memory means, said data processor operable for receiving said output signal from said data entry terminal and for comparing said products or qualifiers identified therein to said sample/premium file, said data processor generating a unique code if any of said purchased products or qualifiers are listed in said sample/premium file,
   a printer coupled to said data processor and operative for printing said unique code, and
   dispensing means coupled to said microprocessor and operative for dispensing a sample or premium upon entry of said unique code.

10. A system for dispensing sample products or premiums according to claim 9, wherein said data entry terminal comprises a scanner capable of reading UPC codes.

11. A system for dispensing sample products or premiums according to claim 9, further comprising a plurality of sample/premium files, each of which is associated with a specific sample or premium to be dispensed.

12. A system for dispensing sample products or premiums according to claim 9, wherein said output signal generated by said data entry terminal comprises a UPC code for identifying said purchased products.

13. A system for dispensing sample products or premiums according to claim 9, wherein said output signal generated by said data entry terminal comprises data identifying a predetermined qualifier.

14. A system for dispensing sample products or premiums according to claim 9, wherein said data processor comprises a microprocessor.

15. A system for dispensing sample products or premiums according to claim 9, wherein said unique code contains a reference identifying said sample or premium to be dispensed, said dispensing means comprising an input means for entry of said unique code and operative for dispensing the identified sample or premium.

16. A system for dispensing sample products or premiums according to claim 15, wherein said unique code is validated by said data processor, upon validation of said unique code, said data processor generates a dispense signal which controls said dispensing means to dispense said sample or premium identified by said unique code.

17. A system for dispensing sample products or premiums according to claim 16, wherein upon entry of said unique code into said dispensing means, said unique code is removed a list identifying all active unique codes.

18. A system for dispensing sample products or premiums according to claim 9, wherein said dispensing means comprises a microprocessor coupled to a data port, said data port being coupled to said data processor.

19. A system for dispensing sample products or premiums according to claim 9, wherein each of said unique codes generated by said data processor are stored in a memory.

20. A method for dispensing sample products or premiums, said method comprising the steps of:
   identifying each qualifier entitling the consumer to receive a product sample or premium, such as identifying each item being purchased by a given consumer or identifying another predetermined qualifier, and generating an output signal identifying each of said qualifiers,
   storing at least one sample/premium file, said sample/premium file identifying each qualifier for which a given sample or premium should be dispensed,
   comparing the qualifiers identified in said output signal to said sample/premium file, and generating a dispense signal if any of said purchased products or other qualifiers are listed in said sample/premium file, and
   transmitting said dispense signal to a sample/premium dispenser, and dispensing a sample or premium.

21. The method for dispensing sample products or premiums according to claim 20, wherein said products or premiums are identified utilizing unique codes.

22. The method for dispensing sample products according to claim 20, wherein a plurality of sample/premium files are stored, each of which is associated with a specific sample or premium to be dispensed.

23. The method for dispensing sample products or premiums according to claim 20, wherein said output signal contains a reference for identifying said purchased products or qualifiers.

24. The method for dispensing sample products or premiums according to claim 20, wherein said dispense signal contains a field identifying said sample or premium to be dispensed.

25. A method for dispensing sample products or premiums, said method comprising the steps of:

identifying each qualifier entitling the consumer to receive a product sample or premium, such as identifying each item being purchased by a given consumer or identifying a predetermined qualifier, and generating an output signal identifying each of said qualifiers, storing at least one sample/premium file, said sample/premium file identifying each product for which a given sample or premium should be dispensed, comparing the products identified in said output signal to said sample/premium file, and generating a unique code if any of said purchased products are listed in said sample file, said unique code identifying the sample or premium to be dispensed, printing said unique code, and inputting said unique code into a dispenser, and dispensing a sample.

26. A method for dispensing sample products or premiums according to claim 25, wherein said unique code contains a reference identifying said sample or premium to be dispensed.

27. A method for dispensing sample products or premiums according to claim 26, further comprising the steps of:

entering said unique code into said dispensing means via an input means disposed on said dispensing means, validating said unique code, and generating a dispense signal upon validation of said unique code, said dispense signal controlling said dispensing means to dispense said sample or premium identified by said unique code.

28. A method for dispensing sample products or premiums according to claim 27, wherein upon entry of said unique code into said dispensing means, said unique code is removed from a list identifying all active unique codes.

29. A system of dispensing sample products and premiums according to claim 1, wherein said data processor records a plurality of transaction data and stores said transaction data in said memory means, said transaction data comprising each product being purchased by a given customer.

30. A system of dispensing sample products and premiums according to claim 1, wherein said data processor records a plurality of transaction data and stores said transaction data in said memory means, said transaction data comprising each product being purchased by a given customer and the identity of the given customer.

31. A system of dispensing sample products and premiums according to claim 1, wherein said data processor records a plurality of transaction data and stores said transaction data in said memory means, said transaction data comprising a given store loyalty card, a credit card, coupons.

\* \* \* \* \*